US010472205B2

(12) United States Patent
Kuoppala et al.

(10) Patent No.: US 10,472,205 B2
(45) Date of Patent: Nov. 12, 2019

(54) BUILDING AUTOMATION SYSTEM CONTROL APPARATUS, METHOD AND COMPUTER PROGRAM FOR PROVIDING CONTROL SIGNALLING

(71) Applicants: Hannu Kuoppala, Helsinki (FI); Ari Hanninen, Hyvinkaa (FI)

(72) Inventors: Hannu Kuoppala, Helsinki (FI); Ari Hanninen, Hyvinkaa (FI)

(73) Assignee: Kone Corporation, Helsinki (FI)

(*) Notice: Subject to any disclaimer, the term of this patent is extended or adjusted under 35 U.S.C. 154(b) by 318 days.

(21) Appl. No.: 14/870,724

(22) Filed: Sep. 30, 2015

(65) Prior Publication Data

US 2016/0018805 A1 Jan. 21, 2016

Related U.S. Application Data

(63) Continuation of application No. PCT/FI2013/050404, filed on Apr. 12, 2013.

(51) Int. Cl.
*B66B 5/00* (2006.01)
*B66B 1/24* (2006.01)
(Continued)

(52) U.S. Cl.
CPC .......... *B66B 5/0018* (2013.01); *B66B 1/2491* (2013.01); *B66B 1/466* (2013.01);
(Continued)

(58) Field of Classification Search
CPC ..... B66B 1/2491; B66B 1/466; B66B 5/0018; B66B 5/0025; B66B 2201/211;
(Continued)

(56) References Cited

U.S. PATENT DOCUMENTS

| 5,131,508 A | * | 7/1992 | Suzuki | ................. B66B 5/0012 187/380 |
| 7,377,365 B2 | * | 5/2008 | Abe | ..................... B66B 1/2416 187/396 |

(Continued)

FOREIGN PATENT DOCUMENTS

| CN | 101102952 A | 1/2008 |
| CN | 202421852 U | 9/2012 |

(Continued)

OTHER PUBLICATIONS

International Search Report PCT/ISA/210 for International Application No. PCT/FI2013/050404 dated Jan. 17, 2014.

(Continued)

*Primary Examiner* — Crystal J Barnes-Bullock
(74) *Attorney, Agent, or Firm* — Harness, Dickey & Pierce, P.L.C.

(57) ABSTRACT

According to an embodiment there is provided a building automation system control apparatus comprising building automation system control logic configured to receive signaling from entities connected to a building automation system and to cause transmission of control signaling to the entities connected to the building automation system, wherein the building automation system control logic comprises elevator control logic as an integral part to directly control an elevator system comprising one or more elevators, the building automation system control logic being configured to take into account signaling received from the entities connected to the building automation system when determining control signaling for the elevator system; and the building automation system control logic being configured to take into account signaling received from the elevator system when determining control signaling for the entities connected to the building automation system.

11 Claims, 4 Drawing Sheets

(51) Int. Cl.
| | |
|---|---|
| *B66B 1/46* | (2006.01) |
| *G05B 11/01* | (2006.01) |
| *G05B 19/042* | (2006.01) |
| *G05B 17/02* | (2006.01) |
| *G05B 19/418* | (2006.01) |
| *G05B 23/00* | (2006.01) |
| *G06Q 50/16* | (2012.01) |
| *H02J 3/14* | (2006.01) |
| *H02J 13/00* | (2006.01) |
| *G05B 15/02* | (2006.01) |
| *B66B 5/02* | (2006.01) |

(52) U.S. Cl.
CPC ............ *B66B 5/0025* (2013.01); *B66B 5/021* (2013.01); *G05B 11/01* (2013.01); *G05B 15/02* (2013.01); *G05B 17/02* (2013.01); *G05B 19/042* (2013.01); *G05B 19/4185* (2013.01); *G05B 23/00* (2013.01); *G06Q 50/163* (2013.01); *H02J 3/14* (2013.01); *H02J 13/0013* (2013.01); *H02J 13/0062* (2013.01); *B66B 2201/211* (2013.01); *B66B 2201/212* (2013.01); *B66B 2201/222* (2013.01); *G05B 2219/25006* (2013.01); *G05B 2219/25011* (2013.01); *G05B 2219/2642* (2013.01); *G05B 2219/2659* (2013.01); *H02J 2003/143* (2013.01); *Y02B 70/3216* (2013.01); *Y02B 70/3241* (2013.01); *Y04S 10/40* (2013.01); *Y04S 20/221* (2013.01); *Y04S 20/227* (2013.01)

(58) Field of Classification Search
CPC ........ B66B 2201/212; B66B 2201/222; G05B 11/01; G05B 15/02; G05B 17/02; G05B 19/042; G05B 19/4185; G05B 2219/2642; G05B 2219/25011; G05B 2219/25006; G05B 23/00; G06Q 50/163; H02J 13/001; H02J 13/0013; H02J 13/0062; H02J 3/14; H02J 2003/143; Y02B 70/3216; Y02B 70/3241; Y04S 10/40; Y04S 20/221; Y04S 20/227
See application file for complete search history.

(56) References Cited

U.S. PATENT DOCUMENTS

| | | | |
|---|---|---|---|
| 7,634,555 B1* | 12/2009 | Wainscott, Jr. | H04L 12/40006 700/19 |
| 8,528,701 B2* | 9/2013 | Schwarzentruber | B66B 1/468 187/384 |
| 8,788,097 B2* | 7/2014 | Drees | G05B 15/02 700/275 |
| 9,411,327 B2* | 8/2016 | Park | G05B 15/02 |
| 9,414,458 B2* | 8/2016 | Pederson | H05B 33/0863 |
| 9,429,927 B2* | 8/2016 | Nesler | G01R 21/133 |
| 9,580,274 B2* | 2/2017 | Nowel | F24F 11/30 |
| 9,927,674 B2* | 3/2018 | Brown | H04L 12/2803 |
| 9,929,872 B2* | 3/2018 | Keenan, Jr. | G05B 15/02 |
| 9,972,144 B2* | 5/2018 | Klein | G06F 16/951 |
| 10,269,195 B2* | 4/2019 | Klein | G06F 16/951 |
| 10,296,851 B2* | 5/2019 | Klein | G06Q 10/02 |
| 2007/0143451 A1* | 6/2007 | Huth | G05B 19/042 709/220 |
| 2008/0217112 A1* | 9/2008 | Puskala | B66B 1/468 187/392 |
| 2009/0034414 A1* | 2/2009 | Schuette | H04L 41/0896 370/230.1 |
| 2009/0120727 A1 | 5/2009 | Hamaji et al. | |
| 2009/0231092 A1* | 9/2009 | Maegawa | G05B 15/02 340/5.2 |
| 2010/0063641 A1* | 3/2010 | Scholten | G05B 15/02 700/287 |
| 2011/0264276 A1* | 10/2011 | Kressner | H02J 3/14 700/276 |
| 2012/0022700 A1 | 1/2012 | Drees et al. | |
| 2012/0285774 A1* | 11/2012 | Harkonen | B66B 1/302 187/289 |
| 2013/0048436 A1* | 2/2013 | Chan | B66B 1/2408 187/387 |
| 2013/0116835 A1* | 5/2013 | Nowel | F24F 11/30 700/278 |
| 2013/0175121 A1* | 7/2013 | Hanninen | B66B 1/2491 187/380 |
| 2014/0152651 A1* | 6/2014 | Chen | G06T 19/003 345/419 |
| 2015/0177722 A1* | 6/2015 | Chan | G05B 15/02 700/275 |
| 2015/0274486 A1* | 10/2015 | Wilke | B66B 5/0025 187/391 |
| 2018/0093861 A1* | 4/2018 | Stranieri | B66B 1/28 |
| 2018/0364654 A1* | 12/2018 | Locke | G05B 13/0265 |
| 2019/0017719 A1* | 1/2019 | Sinha | G05B 15/02 |
| 2019/0116058 A1* | 4/2019 | Kaliappan | H04L 12/2827 |

FOREIGN PATENT DOCUMENTS

| | | |
|---|---|---|
| CN | 103163854 A | 6/2013 |
| EP | 1808396 A2 | 7/2007 |
| JP | 2006-131373 A | 5/2006 |

OTHER PUBLICATIONS

Written Opinion of the International Searching Authority PCT/ISA/237 for International Application No. PCT/FI2013/050404 dated Jan. 17, 2014.

Kastner et al., "Communication Systems for Building Automation and Control", Proceedings of the IEEE, vol. 93, No. 6, pp. 1178-1203, Jun. 2005.

Brambley et al., "Advanced Sensors and Controls for Building Applications: Market Assessment and Potential R&D Pathways", U.S. DOI: 10.2172/859997, pp. 5.14-5.21, Apr. 13, 2005.

European Office Action dated Dec. 1, 2016, issued in a European Patent Application No. 13881513.9-1807.

Chinese Office Action dated Oct. 25, 2016 for corresponding Chinese Patent Application No. 2013800755490 and English translation thereof.

* cited by examiner

BUILDING AUTOMATION SYSTEM CONTROL APPARATUS, METHOD AND COMPUTER PROGRAM FOR PROVIDING CONTROL SIGNALLING

This application is a continuation of PCT International Application No. PCT/FI2013/050404 which has an International filing date of Apr. 12, 2013, the entire contents of which are incorporated herein by reference.

FIELD OF THE INVENTION

The invention relates to building automation systems.

BACKGROUND OF THE INVENTION

A building automation system (BAS) is a network of devices used in one or more building systems. Building automation systems may operate cooperatively to share building information and control system devices automatically according to programmed logic. While managing various building systems, the automation system usually also ensures the operational performance of the building as well as the comfort and safety. For example, a building automation system may keep the building air conditioning within a specified range, provide lighting, and monitor system performance and device failures.

The building automation system may also be interconnected with a control system or systems of elevators in a building so that the building automation system can provide signaling to the elevator control system, for example, in an emergency situation. The interworking between the building automation system and the elevator control logic is usually arranged such that the building automation system provides the elevator control with information signals (for example indicating an emergency situation in a certain floor) and the elevator control located within the elevator system determines actions to be performed based on its control logic.

Based on the above, there is a need for a solution enabling more versatile usage of information in a building automation system.

SUMMARY

According to a first aspect there is provided a building automation system control apparatus. The apparatus comprises building automation system control logic configured to receive signaling from entities connected to a building automation system and to cause transmission of control signaling to the entities connected to the building automation system, wherein the building automation system control logic comprises elevator control logic as an integral part to directly control an elevator system comprising one or more elevators. The building automation system control logic is configured to take into account signaling received from the entities connected to the building automation system when determining control signaling for the elevator system. Further, the building automation system control logic being configured to take into account signaling received from the elevator system when determining control signaling for the entities connected to the building automation system.

In one embodiment, the elevator control logic comprises elevator control and elevator group control.

In one embodiment, the building automation system control device is configured to control a display device connected to the building automation system to provide information about elevators.

According to a second aspect there is provided a building automation system comprising a building automation system control apparatus according to the first aspect.

According to a third aspect, there is provided a method comprising receiving, by an apparatus, signaling from entities connected to a building automation system; causing transmission, by the apparatus, of control signaling to the entities connected to the building automation system; controlling, by the apparatus, an elevator system comprising one or more elevators taking into account, by the apparatus, signaling received from the entities connected to the building automation system when determining control signaling for the elevator system; and taking into account, by the apparatus, signaling received from the elevator system when determining control signaling for the entities connected to the building automation system.

In one embodiment, the elevator control logic comprises elevator control and elevator group control.

In one embodiment, the method further comprises controlling a display device connected to the building automation system to give information about elevators.

According to a fourth aspect there is provided a method computer program comprising program code, which when executed by a processor, performs the method of the third aspect.

The embodiments described herein may be used in any combination with each other. Several of the embodiments may be combined together to form a further embodiment of the invention.

SHORT DESCRIPTION OF THE DRAWINGS

Figure 3:
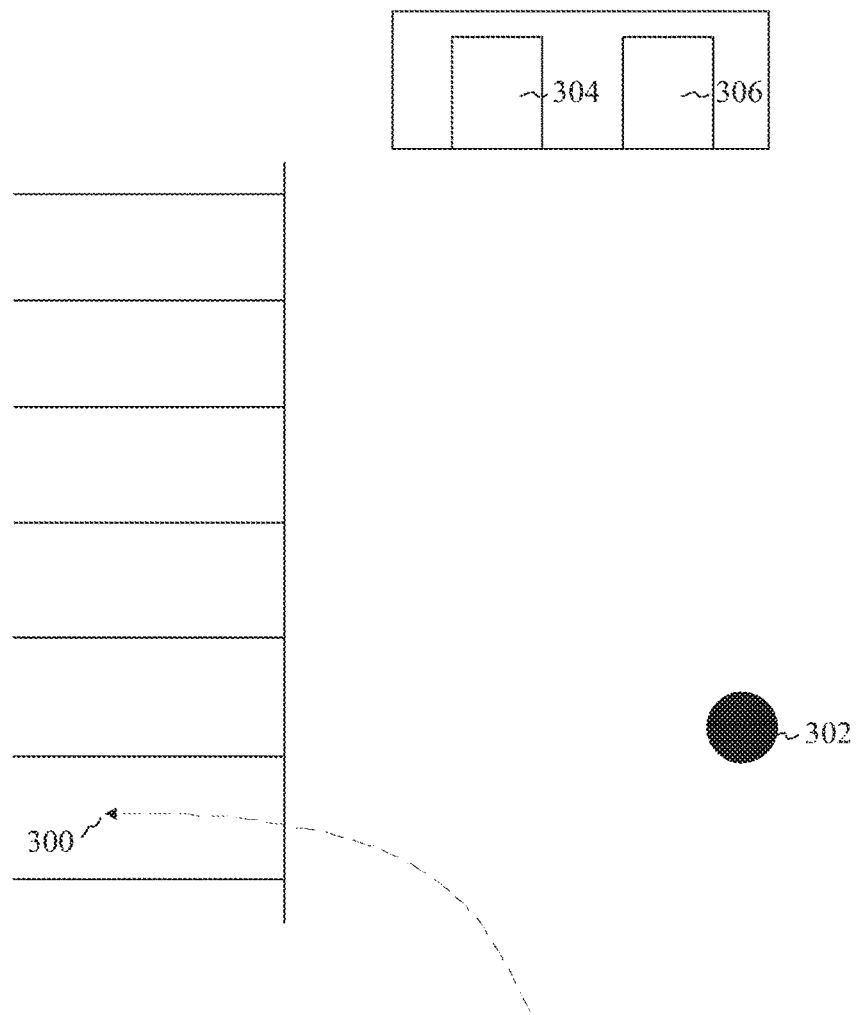

FIG. 3 discloses an example that illustrates using information contained in a building automation system in controlling an elevator system.

Figure 4:
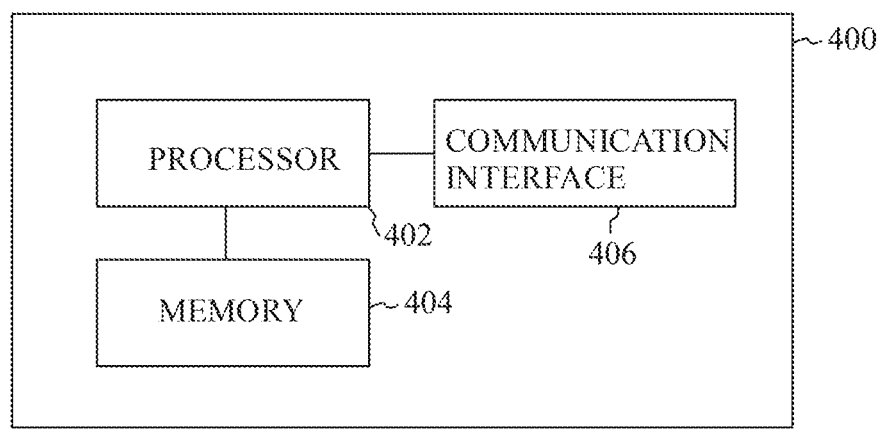

FIG. 4 illustrates an apparatus according to one embodiment of the invention.

DETAILED DESCRIPTION

Reference will now be made in detail to the embodiments of the present invention, examples of which are illustrated in the accompanying drawings.

Figure 1:
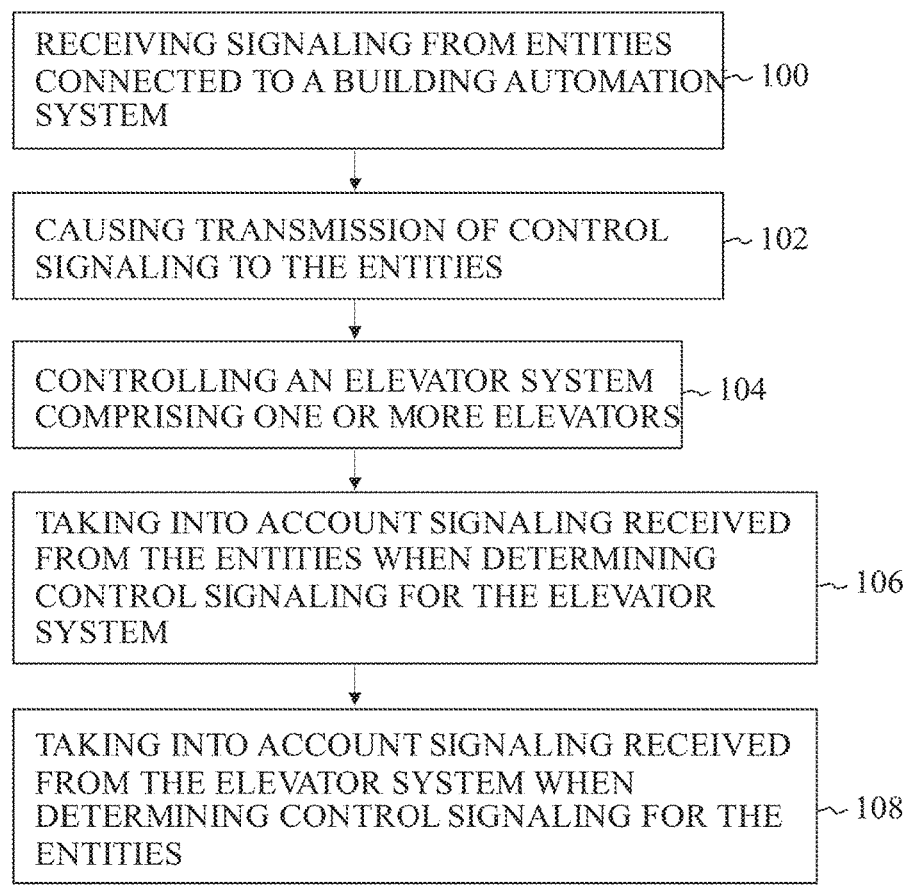
FIG. 1 illustrates a method according to one embodiment of the invention.

FIG. 1 illustrates a method according to one embodiment of the invention. In step 100, signaling is received by an apparatus from entities connected to a building automation system. The signaling indicates, for example, that something has happened and it has been detected (for example, a door has been opened, a light switch has been operated, movement has been detected by a detector etc.). In step 102, control signaling is caused to be transmitted by the apparatus to the entities connected to the building automation system. The control signaling refers to signaling based on which a receiving entity performs a certain action (for example, in response to detecting authorized access to an office, signaling to a door lock to open).

In step 104, an elevator system comprising one or more elevators is controlled by the apparatus. This means that controlling functions usually provided by the elevator system itself are now performed by the apparatus in the building automation system. In step 106, signaling received from the entities connected to the building automation system is taken into account by the apparatus, when determining control signaling for the elevator system. Similarly in step 108, signaling received from the elevator system is taken into account by the apparatus, when determining control signaling for the entities connected to the building automation system.

Figure 2:
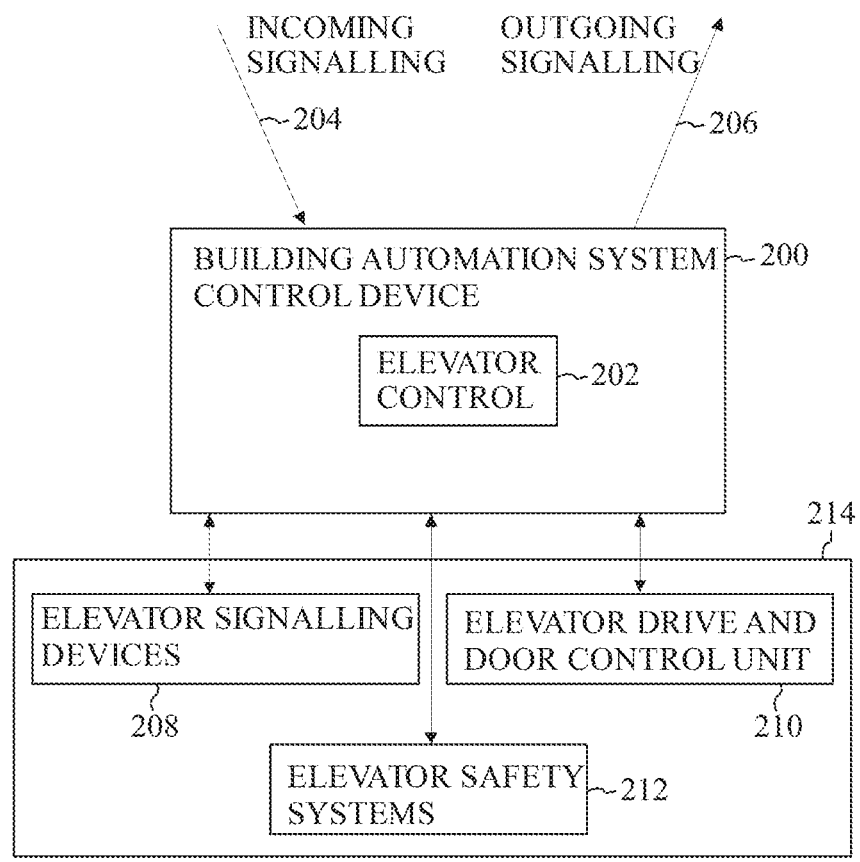
FIG. 2 illustrates a system according to one embodiment of the invention.

FIG. 2 illustrates a building automation system according to one embodiment of the invention. The building automation system comprises a building automation system control device 200 which provides intelligence needed in controlling various devices and other entities connected to the building automation system. The building automation system control device 200 may be implemented, for example, as one or more pieces of software running in one or more server computers.

The building automation system control device 200 is configured to receive incoming signaling 204 from a plurality of devices or software entities. Such devices or software entities comprise, for example, at least one of doors, locks, burglar alarms, motion detectors, cameras, light switches, elevator signaling devices, elevator operation panels (for example, elevator car operation panels and destination operator panels), or virtually any device which may provide information to the building automation system.

Similarly the building automation system control device 200 is configured to cause transmission of outgoing signaling 206 to devices and other entities which need to be controlled, for example, door locks, a burglar alarm system to switch on/off etc.

The building automation system control device 200 comprises also elevator control 202. Traditionally, building automation systems and elevator control have been separated into separate functional entities. There has, however, been a connection between the two systems. For example, previously the building automation system may have sent a signal and the elevator control made the determination whether any actions are needed based on the signal and then controlled one or more elevators based on the determination. FIG. 2 illustrates an embodiment of the invention which introduces elevator control 202 as an integral part of the building automation system control. The elevator control 202 is configured to control, for example, at least one of an elevator drive and door control unit 210 of an elevator system 214, an elevator safety system 212 and elevator signaling devices 208.

The building automation system control device 200 is configured to take into account signaling received from the entities connected to the building automation system when determining control signaling for the elevator system 214. Similarly, the building automation system control device is configured to take into account signaling received from the elevator system 214 when determining control signaling for the entities connected to the building automation system.

For example, the elevator control 202 provides the elevator drive and door control unit 212 instructions to drive an elevator car to a certain floor, instructs to use a special speed profile etc. Similarly, the elevator control 202 may provide the elevator drive and door control unit 210 instructions to open or close an elevator door.

The building automation system control device 200 may comprise elevator group control and elevator control functions. The elevator system 214 may comprise several elevators arranged in one or more elevator groups and the building automation system control device 200 may change the sizes of elevator groups when necessary based on the information contained in building automation system control device 200.

A benefit of using the building automation system to provide elevator control is that any data possessed by the building automation system can be used in controlling elevators and/or elevator groups without requiring that the elevator system itself understands what is happening. Similarly, any signal from the elevator system or elevator control can be used in controlling other functions of the building automation system or entities connected to the building automation system.

In one embodiment, the controlling functions of the building automation system may also be distributed to several control devices instead of just one.

The building automation system device of FIG. 2 may control various units or devices of a building automation system based on information relating to one or more elevators, for example, at least one of the following:

Lights
- When the last person from certain floor has departured, lights can be switched off.
- When the elevator is arriving to an empty floor, lights can be switched on.
- Elevator lobby lights when elevator arrives, rest can be controlled by movement detectors etc. when applicable.

HVAC (Heating, Ventilation, and Air Conditioning)
- When the number of people in one floor is decreasing, the HVAC units can be turned to lower power.
- When the number of people in one floor is increasing, the HVAC units can be turned to higher power.
- When there is a first person the building automation system knows that is going to an empty floor, and HVAC can be switched on.
- When the last person from certain floor has departured, HVAC can be switched to 'low mode'.

Doors, locks and burglar alarms
- When the last person from certain floor has departured, all automatic and fire protection doors can be closed and locked, burglar alarms can be turned on.
- When an elevator is arriving to an empty floor, and the person arriving is known, burglar alarms can be turned off, selected locks and selected doors can be opened.

Control of automatic windows or sunscreens can be controlled based on the elevator information.

In one embodiment of FIG. 2, the building automation system control device 200 is configured to control a display device or display devices connected to building automation system to provide information about elevators. The following lists some possible examples:

In principle, any display, which is connected to the building automation system, either directly or indirectly:
- Any personal computer in a building, if a computer network is connected via the building automation system.
- Any television in the building if the antenna network is connected via the building automation system.
- Any display, mobile phone, monitor (including CCTV system screens) which is connected either physically or through a wireless system, such as the Bluetooth or WLAN (Wireless Local Area Network), to the building automation system.
- All traditional elevator signaling devices, no matter where they are located physically.

In one embodiment of FIG. 2, the building automation system control device 200 is configured to receive incoming signaling from various units connected to the building automation system, and the building automation system control device 200 may use this signaling in controlling elevators. Signaling may be received, for example, from any of the following sources:

All detectors which can detect, for example, human presence:
kinect cameras
heat detectors
normal cameras
movement detectors
any analog or digital I/O unit
all traditional elevator signaling devices, no matter where they are located physically
key switches
light on/off switches
opening of any door/lock
any touch screen or any remote controller
any mobile phone, which is connected to the building automation system
a charger when connected/disconnected to/from building power supply
any electrical appliance via smart building power supply or via building digital network
External traffic data
metro arrivals and departures
bus arrivals and departures
train arrivals and departures
data from arriving taxis and limousines
power grid data
Weather forecasts FIG. 3 discloses an example which illustrates the integration of elevator control into building automation system control logic.

In the example of FIG. 3, a car arrives at an entrance of a parking floor of an office building. The driver shows his access card to a building access system, and the parking floor door opens. Information about the arriving driver is delivered to the building automation system. The building automation system makes an initial estimate that it takes two minutes before an elevator is needed in the parking floor for the driver.

In the example of FIG. 3, the driver selects a parking place as indicated by a reference number 300. On a parking floor supporting structure 302 (e.g. a concrete pile), a detector relating to a security system connected to the building automation system has been installed. When the driver passes the detector, the building automation system receives information from the security system detector and the building automation system may update the time estimate by which the driver reaches the elevators 304, 306. The updated time estimate is then used in allocating an elevator 304 or 306 for the driver.

If the parking places are not numbered, most probably the first arrivals drive to a place which is the closest to the elevators 304, 306. Therefore the estimated time may increase during the day, when the parking places are getting full and people have longer distance to walk to the elevators 304, 306 from their cars.

In another embodiment of FIG. 3, each parking place has a vacant/occupied detector which indicates the exact parking place position of a driver needing an elevator to the building automation system. The building automation system is then able to estimate the time to walk to reach the elevators. If the driver decides to take an alternative route, the building automation system may get additional information from various doors and detectors and can then stop updating the time estimate.

If the driver drives an electric car, even plugging the electric car to the grid may cause an update to the time estimation to reach the elevators since the building automation system is aware of the plugging of the car to the grid.

FIG. 4 discloses a block diagram illustrating an apparatus 400 according to one embodiment of the invention. The apparatus comprise a processor 402 connected to a memory 404 and a communication interface 406. The apparatus may also comprise several processors or memories. The memory 404 or memories comprises a computer program which, when executed by the processor 402 or processors, perform the various steps already disclosed in more detail above. The communication interface 406 is configured to receive/transmit information from/to external entities, for example, to devices and/or systems connected to a building automation system. The apparatus is, for example, a server computer. The memory 404 may include a computer program or program which, when executed by the processor 402, causes the apparatus to perform the programmed functionality.

The exemplary embodiments of the invention can be implemented with any suitable device, for example, including any suitable servers, workstations, PCs, laptop computers, PDAs, Internet appliances, handheld devices, cellular telephones, wireless devices, other devices, and the like, capable of performing the processes of the exemplary embodiments, and which can communicate via one or more interface mechanisms, including, for example, Internet access, telecommunications in any suitable form (for instance, voice, modem, and the like), wireless communications media, one or more wireless communications networks, cellular communications networks, 3G communications networks, 4G communications networks Public Switched Telephone Network (PSTNs), Packet Data Networks (PDNs), the Internet, intranets, a combination thereof, and the like.

It is to be understood that the exemplary embodiments are for exemplary purposes, as many variations of the specific hardware used to implement the exemplary embodiments are possible, as will be appreciated by those skilled in the hardware art(s). For example, the functionality of one or more of the components of the exemplary embodiments can be implemented via one or more hardware devices, or one or more software entities such as modules.

The exemplary embodiments can store information relating to various processes described herein. This information can be stored in one or more memories, such as a hard disk, optical disk, magnetooptical disk, RAM, and the like.

As stated above, the components of the exemplary embodiments can include computer readable medium or memories according to the teachings of the present inventions and for holding data structures, tables, records, and/or other data described herein. Computer readable medium can include any suitable medium that participates in providing instructions to a processor for execution. Such a medium can take many forms, including but not limited to, non-volatile media, volatile media, transmission media, and the like.

While the present inventions have been described in connection with a number of exemplary embodiments, and implementations, the present inventions are not so limited, but rather cover various modifications, and equivalent arrangements, which fall within the purview of prospective claims.

Furthermore, the embodiments of the invention described herein may be used in any combination with each other. Several of the embodiments may be combined together to form a further embodiment of the invention.

It is obvious to a person skilled in the art that with the advancement of technology, the basic idea of the invention may be implemented in various ways. The invention and its embodiments are thus not limited to the examples described above; instead they may vary within the scope of the claims.

The invention claimed is:

1. A building automation system control apparatus comprising:
   a building automation system controller including an elevator control logic configured to control an elevator system including one or more elevators and building automation control logic configured to control a building automation system such that the building automation system controller is configured to,
   determine elevator control signaling for the elevator system based on peripheral data received from peripheral devices connected to the building automation system, the peripheral devices being associated with one or more of (i) lighting, (ii) heating, ventilation and air conditioning (HVAC), and (iii) security of a building controlled by the building automation control system,
   determine automation control signaling for the peripheral devices connected to the building automation system based on elevator data received from the elevator system, the elevator data being associated with one or more of (i) elevator speed profile, (ii) destination floor, and (iii) elevator door status,
   transmit the automation control signals to the peripheral devices such that the automation control signaling instructs the peripheral devices to perform one or more of (i) switching the lighting, (ii) adjusting the HVAC and (iii) enabling or disabling the security based on the elevator data, and
   transmit the elevator control signals to the one or more elevators, such that the elevator control signaling instructs the elevators to operate one or more of (i) an elevator door, (ii) an elevator drive device, (iii) an elevator safety system, or (iv) an elevator signaling device based on the peripheral data.

2. The building automation system control apparatus according to claim 1, wherein the elevator control logic includes an elevator control and an elevator group control.

3. The building automation system control apparatus according to claim 1, wherein the building automation system controller is further configured to control a display device connected to the building automation system to provide information about the one or more elevators.

4. The building automation system control apparatus according to claim 1, wherein the elevator control logic and the building automation control logic are integrated together in same processing circuitry.

5. A building automation system comprising:
   an elevator system including one or more elevators; and
   a building automation system control apparatus operatively coupled to the elevator system, the building automation system control apparatus including a building automation system controller, the building automation system controller including an elevator control logic configured to control the elevator system and building automation control logic configured to control a building automation system such that, the building automation system controller is configured to receive peripheral data from peripheral devices connected to the building automation system and elevator data from the elevator system, and to cause transmission of elevator control signals and automation control signals to the elevator system and the peripheral devices, respectively; wherein
   the peripheral devices are associated with one or more of (i) lighting, (ii) heating, ventilation and air conditioning (HVAC), and (iii) security of a building controlled by the building automation system,
   the elevator data is associated with one or more of (i) elevator speed profile, (ii) destination floor, and (iii) elevator door status,
   the building automation system controller is further configured to determine the elevator control signaling for the elevator system based on the peripheral data received from the peripheral devices, such that the elevator control signaling instructs the elevators to operate one or more of (1) an elevator door, (ii) an elevator drive device, (iii) an elevator safety system, or (iv) an elevator signaling device based on the peripheral data, and
   the building automation system controller is further configured to determine the automation control signaling for the peripheral devices based on the elevator data received from the elevator system such that the automation control signaling instructs the peripheral devices to perform one or more of (i) switching the lighting, (ii) adjusting the HVAC and (iii) enabling or disabling the security based on the elevator data.

6. The building automation system according to claim 5, wherein the elevator control logic and the building automation control logic are integrated together in same processing circuitry.

7. A method comprising:
   receiving, by an apparatus, peripheral data from peripheral devices connected to a building automation system, and elevator data from an elevator system, the elevator system including one or more elevators, and the peripheral devices associated with one or more of (i) lighting, (ii) heating, ventilation and air conditioning (HVAC), and (iii) security of a building, and the elevator data being associated with one or more of (i) elevator speed profile, (ii) destination floor, and (iii) elevator door status;
   determining, by the apparatus, elevator control signaling for controlling the elevator system based on the peripheral data from the peripheral devices;
   determining, by the apparatus, automation control signaling for the peripheral devices based on the elevator data received from the elevator system;
   transmitting, by the apparatus, the automation control signaling to the peripheral devices, such that the automation control signaling instructs the peripheral devices to perform one or more of (i) switching the lighting, (ii) adjusting the HVAC and (iii) enabling or disabling the security based on the elevator data; and
   transmitting, by the apparatus, the elevator control signaling to the elevator system, such that the elevator control signaling instructs the elevators to operate one or more of (i) an elevator door, (ii) an elevator drive device, (iii) an elevator safety system, or (iv) an elevator signaling device.

8. The method according to claim 7, further comprising:
   controlling, by the apparatus, operation of the one or more elevators of the elevator system.

9. The method according to claim 7, further comprising:

controlling a display device connected to the building automation system to provide information about the one or more elevators.

10. A non-transitory computer readable storage medium including computer program code, which when executed by a processor, causes an apparatus including the processor to perform a method comprising:

receiving peripheral data from peripheral devices connected to a building automation system, and elevator data from an elevator system, the peripheral devices associated with one or more of (i) lighting, (ii) heating, ventilation and air conditioning (HVAC), and (iii) security of a building, and the elevator system including one or more elevators;

determining elevator control signaling for controlling the elevator system based on the peripheral data from the peripheral devices, the elevator data being associated with one or more of (i) elevator speed profile, (ii) destination floor, and (iii) elevator door status;

determining automation control signaling for controlling the peripheral devices based on the elevator data received from the elevator system;

transmitting the automation control signaling to the peripheral devices, such that the automation control signaling instructs the peripheral devices to perform one or more of (i) switching the lighting, (ii) adjusting the HVAC and (iii) enabling or disabling the security based on the elevator data; and transmitting the elevator control signaling to the elevator system, such that the elevator control signaling instructs the elevators to operate one or more of (i) an elevator door, (ii) an elevator drive device, (Hi) an elevator safety system, or (iv) an elevator signaling device.

11. The non-transitory computer readable storage medium according to claim 10, wherein the method further comprises:

controlling a display device connected to the building automation system to provide information about the one or more elevators.

* * * * *